(Model.)
J. C. WALTER.
SIDE BAR WAGON.
No. 244,008. Patented July 5, 1881.
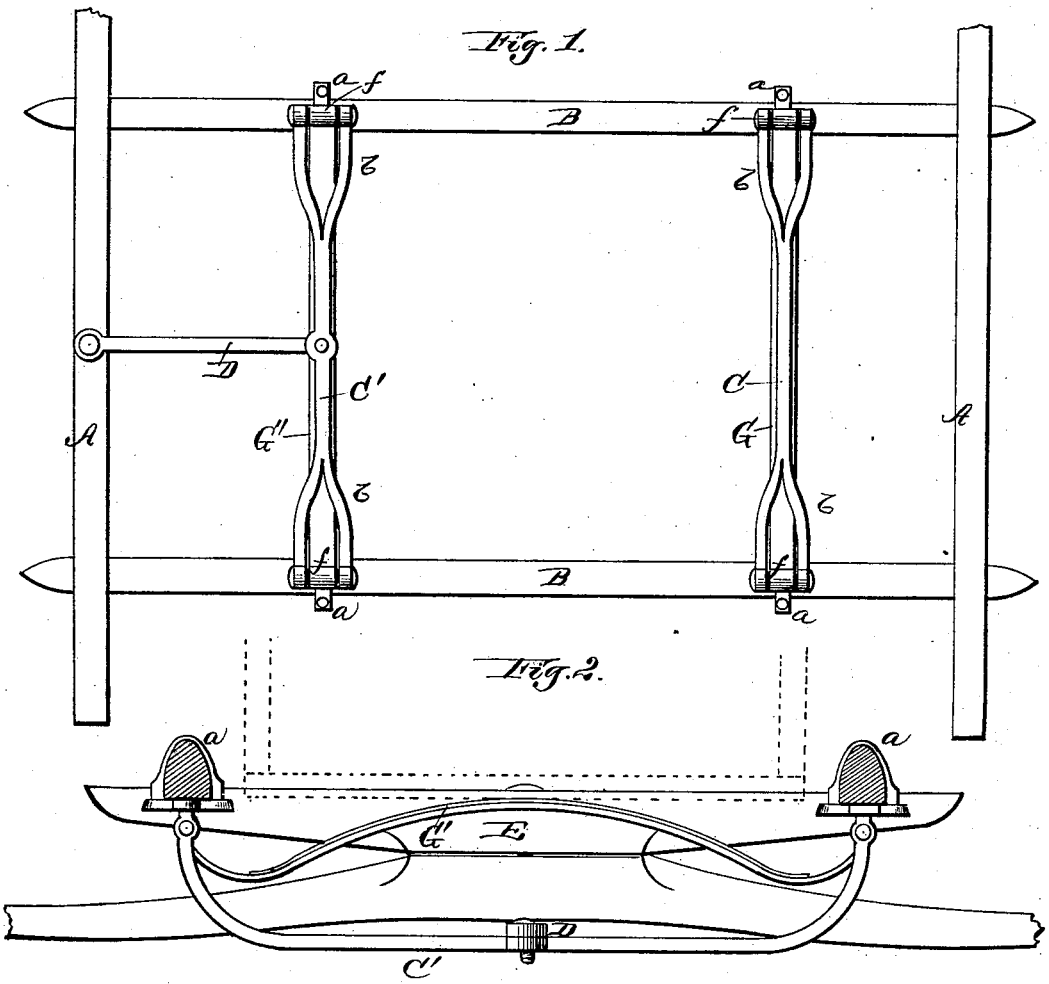
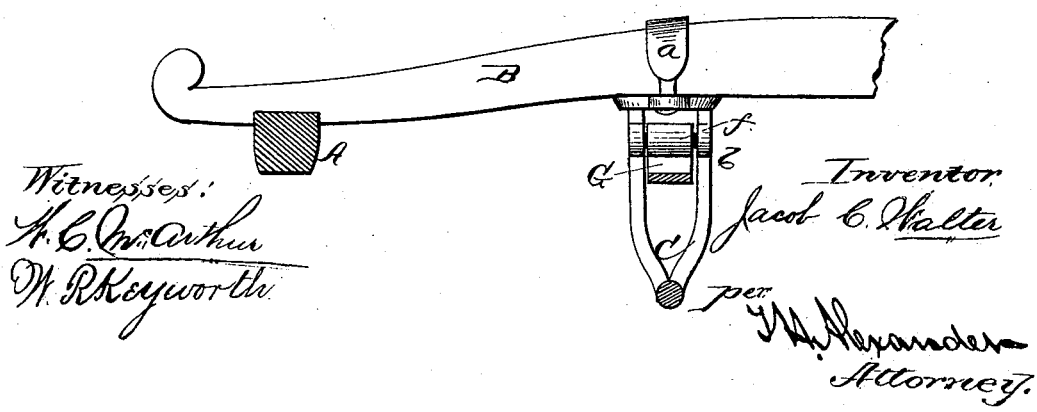

UNITED STATES PATENT OFFICE.

JACOB C. WALTER, OF LEONARDSVILLE, NEW YORK.

SIDE-BAR WAGON.

SPECIFICATION forming part of Letters Patent No. 244,008, dated July 5, 1881.

Application filed May 23, 1881. (Model.)

*To all whom it may concern:*

Be it known that I, JACOB C. WALTER, of Leonardsville, in the county of Madison and State of New York, have invented certain new and useful Improvements in Side-Bar Wagons; and I do hereby declare that the following is a full, clear, and exact description thereof, reference being had to the accompanying drawings, and to the letters of reference marked thereon, which form part of this specification, in which—

Figure 1 is a bottom-plan view of my improved vehicle; Fig. 2, a cross-section just in rear of the forward spring, and Fig. 3 a longitudinal section of one end of the frame and spring.

The nature of my invention relates to side-bar wagons; and it consists in the peculiar construction and arrangement whereby an easy motion is obtained from the springs, the reach between the axles discarded, and the side bars and springs more firmly braced, and the occupants of the vehicle secured from danger of accident in case of the breaking of a spring, as will be hereinafter more fully set forth.

In order to enable others skilled in the art to which my invention appertains to make and use the same, I will now proceed to describe its construction and operation.

A represents the axles, and B B the side bars, of a wagon, the frame constructed and resting upon the axles and bolster E in any of the usual and well-known ways.

At a suitable distance from the axles I secure to the side bars, B B, by clips $a$ $a$, two cross bars or braces, C C'. These braces or safety-bars C are forked at each end, as seen at $b$ in the drawings, and extend across the wagon between and a little distance below the side bars, B B. The forward cross or safety bar, C', is secured to the front axle by a draft-rod, D, thus obviating the necessity of a reach, and cheapening the cost of constructing the vehicle as well as improving its appearance, and forming an equally strong and durable wagon.

The springs G G' are formed crowning in the center, and are bent upward and turned over at each end to form an eye, $f$, which is hung between the forked ends of the cross-bars C C', immediately below the clevises $a$ $a$, which secure them to the side bars, B B.

The wagon-body, as seen in dotted lines in Fig. 2, rests upon the center of the springs, between the side bars, and should one of the springs break, the forked safety bars or braces C C' will catch the body and prevent danger of accident to the occupants of the vehicle.

The springs in common use are usually so attached that their ends are nearly at right angles with the sides of the side bars, and are thus braced against straightening, and are, in consequence, stiff and uncomfortable; but the form of spring herein shown and described, being hung below the side bars and having their ends turned upward, are free to expand endwise when weight is placed upon them, the eye $f$ turning readily and giving an easy and pliable spring.

Having thus fully described my invention, what I claim as new, and desire to secure by Letters Patent, is—

1. The combination, with the side bars and body of a wagon, of the bifurcated bars C C', hung beneath the side bars and having the springs G G' pivoted between their forked ends, all as and for the purpose set forth.

2. The combination of side bars, B B, forked transverse bar C', and draft-rod D, connecting the safety-bar with the axle, all substantially as and for the purpose set forth.

In testimony that I claim the foregoing as my own I affix my signature in presence of three witnesses.

JACOB C. WALTER.

Witnesses:
CHARLES W. MURPHY,
D. BASSETT,
W. H. EAMES.